United States Patent
Winter et al.

(10) Patent No.: US 6,706,199 B2
(45) Date of Patent: Mar. 16, 2004

(54) METHOD FOR WITHDRAWING AND DEWATERING SLAG FROM A GASIFICATION SYSTEM

(75) Inventors: John D. Winter, Independence, KS (US); Rajasekar Kamarthi, Burbank, CA (US); Thomas F. Leininger, Chino Hills, CA (US); Katherine S. Lee, Los Angeles, CA (US); Chih-Hao M. Tsang, Irvine, CA (US); Pravit Vassantachart, Houston, TX (US)

(73) Assignees: Texaco Inc., San Ramon, CA (US); Texaco Development Corporation, San Ramon, CA (US)

( * ) Notice: Subject to any disclaimer, the term of this patent is extended or adjusted under 35 U.S.C. 154(b) by 0 days.

(21) Appl. No.: 09/781,200

(22) Filed: Feb. 13, 2001

(65) Prior Publication Data

US 2001/0026783 A1 Oct. 4, 2001

Related U.S. Application Data

(62) Division of application No. 09/467,384, filed on Dec. 21, 1999, now abandoned.

(51) Int. Cl.[7] .............................................. B01D 37/00
(52) U.S. Cl. ..................... 210/769; 210/415; 48/DIG. 2
(58) Field of Search ....................... 48/DIG. 2, 197 R; 210/767, 768, 780, 413, 415, 769

(56) References Cited

U.S. PATENT DOCUMENTS

| 2,237,428 A | 4/1941 | Hanna .......................... 198/669 |
| 2,443,942 A | 6/1948 | Winkler et al. ............. 198/676 |
| 2,558,006 A | 6/1951 | Shriver et al. .............. 198/672 |
| 3,253,892 A | 5/1966 | Brignac et al. ............. 198/676 |
| 3,602,552 A | 8/1971 | Morgan ....................... 198/672 |
| 3,729,105 A | 4/1973 | Huebler et al. ............. 414/218 |
| 4,401,402 A | 8/1983 | Casperson ................... 414/218 |
| 4,701,266 A | * 10/1987 | Janka et al. ................. 210/803 |
| 4,790,251 A | 12/1988 | Vidt |
| 5,836,524 A | * 11/1998 | Wang ........................... 241/23 |

FOREIGN PATENT DOCUMENTS

| DE | 32 41 239 A1 | 6/1994 |
| EP | 0098340 | 1/1884 |
| EP | 0109210 | 5/1984 |
| EP | 084 1268 | 5/1998 |

* cited by examiner

Primary Examiner—Robert J. Popovics
(74) Attorney, Agent, or Firm—Josetta I. Jones; Frank C. Turner (57) ABSTRACT

The present invention relates to an apparatus and method for withdrawing and dewatering slag from a gasification system. In particular, the present invention relates to a conveying lockhopper and method of using the conveying lockhopper to collect slag and other waste byproducts from the gasifier of a gasification system. The conveying lockhopper is configured to receive slag from a gasifier, simultaneously extract and dewater the slag, and expel the processed slag directly into an awaiting container suitable for carrying the processed slag away. The conveying lockhopper generally comprises a housing with inlet and outlet valves to receive and expel slag, respectively. The housing is inclined at an angle typically between 5 and 60 degrees to the horizontal so that the outlet is at a higher elevation than the inlet. Inside the housing, an auger or similar conveying mechanism conveys the slag from the inlet towards the outlet while simultaneously dewatering the slag. As a result, the processed slag that is discharged at the outlet is fully processed and ready to be transported away.

24 Claims, 9 Drawing Sheets

FIG. 9

METHOD FOR WITHDRAWING AND DEWATERING SLAG FROM A GASIFICATION SYSTEM

This application is a division of Ser. No. 09/467,384 filed Dec. 21, 1999 now abandoned

BACKGROUND OF THE INVENTION

1. Field of the Invention

The present invention relates to an apparatus and method for withdrawing and dewatering slag from a gasification system. In particular, the present invention relates to a conveying lockhopper and method of using the conveying lockhopper with a gasification system.

2. Related Art

Gasification is among the cleanest and most efficient technologies for the production of power, chemicals and industrial gases from hydrocarbon feedstocks, such as coal, heavy oil, and petroleum coke. Gasification converts hydrocarbon feedstocks into clean synthesis gas, or syngas, composed primarily of hydrogen ($H_2$) and carbon monoxide (CO). Gasification allows refineries to self-generate power and produce additional products. Thus, gasification offers greater efficiencies, energy savings, and a cleaner environment. For example, a gasification plant at a refinery in El Dorado, Kans. converts petroleum coke and refinery wastes into electricity and steam, making the refinery entirely self-sufficient for its energy needs and significantly reducing waste and coke handling costs. For these reasons, gasification has increasingly become popular among refineries worldwide. Currently, there are several hundred gasification plants in operation worldwide.

In a gasification plant, the feedstock is mixed with oxygen ($O_2$) and injected into a gasifier. Inside the gasifier, the feedstock and the $O_2$ are subjected to high temperatures and pressures that cause the feedstock and $O_2$ to react and form syngas. Non-gasifiable ash material forms molten slag as a byproduct. Hot syngas exiting the gasifier is cooled either by direct contact with water in a quench chamber, or indirectly in a syngas cooler to recover excess heat/energy. In the direct quench mode, the hot syngas exiting the gasifier contacts water in the quench chamber located in the bottom of the gasifier vessel. The gas is cooled and saturated with steam. The molten ash is rapidly cooled and solidified into irregularly-shaped particles of varying size. Therefore, the quench chamber serves not only to cool and saturate the syngas, but also to disengage slag particles from the syngas, capturing the slag particles in the quench water.

In the syngas cooler mode, hot gas is indirectly cooled in a specifically designed heat exchanger where high pressure export steam is generated. At the exit of the syngas cooler, the cooled syngas is forced to make a rapid direction change as it passes over a pool of water called the syngas cooler sump. Molten and partially solidified slag entrained in the cooled syngas is thus disengaged from the syngas by the combined effects of gravity and momentum. The slag particles which drop down into the syngas cooler sump water then rapidly solidify into irregularly-shaped particles of various sizes.

In addition to $H_2$ and CO, the syngas contains other gases in small quantities, such as carbon dioxide ($CO_2$), water, ammonia, methane, hydrogen sulfide ($H_2S$), carbonyl sulfide (COS), nitrogen, and argon. As much as 99 percent or more of the $H_2S$ and COS present in the syngas can be recovered and converted to elemental sulfur for use in the fertilizer or chemical industries. The clean syngas is then used for generating electricity and producing industrial chemicals and gases.

Most of the ash present in the solid feedstock is removed from the gasifier as solid, glass-like slag particles through a water-sealed, depressurizing lockhopper system. The lockhopper is conventionally a cylindrical vessel vertically oriented with top and bottom valves. This vessel is located directly beneath the gasifier quench chamber or syngas cooler sump.

The conventional lockhopper cycles through collection and dump modes. In the collection mode the top valve—the lockhopper inlet—is open to the gasifier, and the bottom valve—the lockhopper outlet—is closed. The entire lockhopper is filled with water forming a continuous column of water with the quench water, in the quench chamber mode, or with the syngas cooler sump water, in the syngas cooler mode. Thus, during the collection mode, slag entering either the quench chamber or the syngas cooler sump is able to drift unhindered downwards through the lockhopper inlet valve and into the lockhopper vessel.

Slag collection from the gasifier usually lasts for a period of 15–30 minutes. In the dump mode, the inlet is closed and the lockhopper is depressurized. After being depressurized, the bottom valve—the lockhopper outlet—is opened for a short period of time, typically only a few seconds. During this period, the slag is flushed out with a deluge of water from a large overhead flush water tank. The large volume of water flushes the slag out of a conventional lockhopper either into a slag sump with a drag conveyor, or onto a slag pad. Conventional lockhoppers rely on slag sumps, drag conveyors, and slag pads to dewater the slag and prepare it for transportation.

If a slag sump is used, the drag conveyor slowly drags the water-soaked slag up a long incline by means of a series of heavy-duty scrapers connected by parallel chains in an arrangement that looks like a ladder. The drag conveyor circulates through the slag sump much like an escalator. The slag is dewatered by gravity-driven drainage as it get dragged up the incline over the top into a slag bin. In the case where the slag is flushed out of a conventional lockhopper onto a slag pad, the slag is drained of water by gravity as it sits atop the inclined concrete pad. Periodically, a front end loader is used to scoop-up dewatered slag and to transfer it to a slag bin for handling off site. Regardless of whether a slag sump/drag conveyor or a slag pad is used, the water which drains by gravity from the slag contains fine particles of slag which do not remain with the coarser material. This slag water is collected in a slag water sump from which it is pumped and processed as a dilute slurry for additional separation or filtration. Slag sump/drag conveyors, slag pads, and similar equipment usually require that large foundations be excavated in the earth beneath the gasifier and lockhopper so that the equipment can be positioned at the bottom of the lockhopper.

Since the lockhopper is a large elongated cylindrical vessel with top and bottom valves located directly beneath the gasifier, the gasifier structure must be supported high in the air. Because of the considerable weight and size of industrial gasification equipment, the need for structure to support that equipment at an increased elevation adds substantial expense to the gasification process. Because of its height, the elevated gasifier is more difficult to service.

In addition to the inefficiencies associated with supporting an elevated gasifier, the amount of water needed to flush the slag out of a conventional lockhopper during each dump cycle is typically 2–4 times the total volume of the lockhopper. This requires a considerable amount of processing equipment such as a slag drag conveyor or sump system to dispose of the slag and the water. Also, equipment is required to store intake water and to process and dispose of the resulting wastewater. Wastewater must be treated to meet environmental quality standards. The process of treating wastewater and adding new intake water is extremely costly. Additionally, to remove ammonia from the water within the system, an expensive reflux stripper is typically required. In some systems, even after the removal of the ammonia and a large percentage of contaminants, the purged water still does not meet strict environmental regulations.

For these reasons, a need has been recognized by the inventors for an improved lockhopper that can withdraw and process slag from a gasifier without the normal associated equipment and expense involved in supporting large gasification equipment above a large vertical lockhopper, and without expensive and wasteful water treatment processes and equipment.

SUMMARY OF THE INVENTION

The present invention relates to an apparatus and method for withdrawing and dewatering slag from a gasification system. In particular, the present invention relates to a conveying lockhopper and method of using the conveying lockhopper with a gasification system. The present invention solves the problems with, and overcomes the disadvantages of, conventional gasification systems.

In one aspect of the present invention, an apparatus for withdrawing and dewatering slag—referred to herein and by one skilled in the art as a lockhopper—is disclosed. The lockhopper of the present invention is an inclined cylindrical pressure vessel with a rotating auger or equivalent conveying device inside. This new lockhopper design, called a "conveying lockhopper," is inclined, preferably at an angle of between approximately 5 and 60 degrees from the horizontal. The housing of the conveying lockhopper has an inlet and an outlet, both preferably controlled with valves. The inlet is configured to receive slag from a gasifier and the outlet is configured to discharge the processed slag directly into a container suitable for carrying the slag away. The conveying lockhopper is inclined, with the outlet preferably at a higher elevation than the inlet. The rotating auger or other suitable conveying device inside the housing conveys the slag from the inlet to the outlet. The length of the auger and the housing, the pitch of the auger flights, and the auger's rotational speed can all be varied within the purview of the present invention to discharge slag from the conveying lockhopper at the desired rate. Since only a small portion of the conveying lockhopper is disposed beneath the gasifier, the elevation of the gasification system equipment, and consequently the amount of structure needed to support that equipment, is greatly reduced.

In another aspect of the invention, an improved gasification process is provided. Generally, the gasification process comprises supplying feedstocks and $O_2$ or air to the gasifier through an injector, producing syngas which is cooled in a quench chamber, syngas cooler, or other syngas cooling apparatus, passing slag byproduct to the conveying lockhopper, then processing and discharging the slag through the conveying lockhopper. The conveying lockhopper operates in alternating collection and dump modes. In the slag collection mode, the outlet valve of the conveying lockhopper is closed and the inlet valve is opened so that slag can continuously pass from the gasifier into the conveying lockhopper through a continuous column of water that extends between the syngas cooling device and the conveying lockhopper.

Since the inlet valve from the gasifier remains open during this mode, the pressure within the conveying lockhopper is the same pressure as the pressure within the gasifier—typically about 500 pounds per square inch gage (psig), although it may range anywhere from 300 to 1500 psig. During the collection mode, which typically lasts 10–30 minutes, the auger is constantly rotating to breakdown the slag, separate it from the water, and convey it towards the outlet. In dump mode, the inlet valve is closed and the auger is stopped. The water level within the conveying lockhopper is reduced by pushing the water into an atmospheric heel tank using a pressurized cap of nitrogen. After the water has been pushed into the heel tank, the heel tank valve is closed and a vent valve is opened to depressurize the conveying lockhopper. After depressurization, the outlet valve is opened for a short time, typically 1–2 minutes, and the auger is restarted to discharge the slag. The dewatered slag is then discharged through the outlet valve and deposited into awaiting containers suitable for transporting the slag. In preparation for the next collection cycle, the conveying lockhopper is then refilled with water from the heel tank and pressurized to the gasifier operating pressure using an inert gas such as nitrogen. By cycling water in and out of the heel tank, the need for wasteful flushing of the lockhopper, and the corresponding costly equipment to do so, is eliminated.

In another aspect of the invention, the operation of the gasification process, particularly the operation of the conveying lockhopper, is computer controlled. A processor or other type of computer system is coupled to the conveying lockhopper to control the operation in collection and dump modes.

In yet another aspect of the invention, an apparatus for moving material is provided. The apparatus comprises an inclined conveyor with an inlet and an outlet, wherein the material is introduced to the conveyor by way of the inlet, the conveyor transports the material toward the outlet, and the material is expelled from the conveyor through the outlet.

In another aspect of the present invention, a pipe, pipe spool, or other type of storage buffer is attached to the outlet of the conveying lockhopper to act as a buffer for storing dewatered slag prior to discharge. The addition of a pipe spool ensures that dewatered slag does not collect at the discharge end of the conveying lockhopper where it could jam rotating seals and hamper auger operation. Utilizing a pipe spool may allow the auger to operate at a higher rotational speed, thus reducing the amount of torque vis-à-vis auger shaft speed required from the motor. Moreover, embodiments employing a pipe spool allow the conveying lockhopper to continuously collect and process slag while dewatered slag is being purged from the pipe spool.

Accordingly, the present invention provides an apparatus and method that eliminate costly excess structure, equipment, and processes for removing slag from a gasification system.

Features and Advantages

The present invention greatly reduces the height to which the gasifier must be elevated in order to position the lockhopper for use with the gasifier. As a result, the need for heavy duty structure to support an elevated gasifier is significantly reduced.

The present invention eliminates the need for a drag conveyor or a slag sump system to withdraw and process slag from the lockhopper. Consequently, there is no need for a drag conveyor or slag sump system, and no need to excavate the surface beneath the gasifier and lockhopper to accommodate such equipment.

The present invention is more cost effective and efficient because substantial amounts of processing equipment associated with the conventional lockhopper drag conveyor and slag sump water systems are eliminated. The installed cost of a slag handling system is, therefore, significantly reduced.

The present invention simplifies the process of disposing of dewatered slag by providing for the discharge of dewatered slag directly into transportable containers, eliminating the need for manpower and maintenance intensive operations associated with preparing processed slag for transportation.

The present invention significantly reduces the transportation cost for disposing of discharged slag from the lockhopper because the overall weight of the dewatered slag is lowered.

The present invention simplifies slag processing operations such as slag washing or pH adjustment for lowering the -concentration of leachable metals on the slag.

Additional features and advantages of the invention will be set forth in the description that follows, and in part will be apparent from the description, or may be learned in practice of the invention.

BRIEF DESCRIPTION OF THE DRAWINGS

The accompanying drawings, which are incorporated in and constitute a part of this specification, illustrate embodiments of the invention and, together with the description, serve to explain the features, advantages, and principles of the invention.

FIG. 4 is a detailed view of part of the embodiment of FIG. 3a.

FIG. 5 is a detailed view of part of the embodiment of FIG. 4.

DETAILED DESCRIPTION OF THE PREFERRED EMBODIMENTS

Reference will now be made in detail to the present preferred embodiments of the invention, examples of which are illustrated in the accompanying drawings. The exemplary embodiment of this invention is shown in some detail, although it will be apparent to those skilled in the relevant art that some features which are not relevant to the invention may not be shown for the sake of clarity. The apparatus of the present invention will first be described. Following description of the apparatus, processes for employing the apparatus of the present invention will be described.

Figure 1:
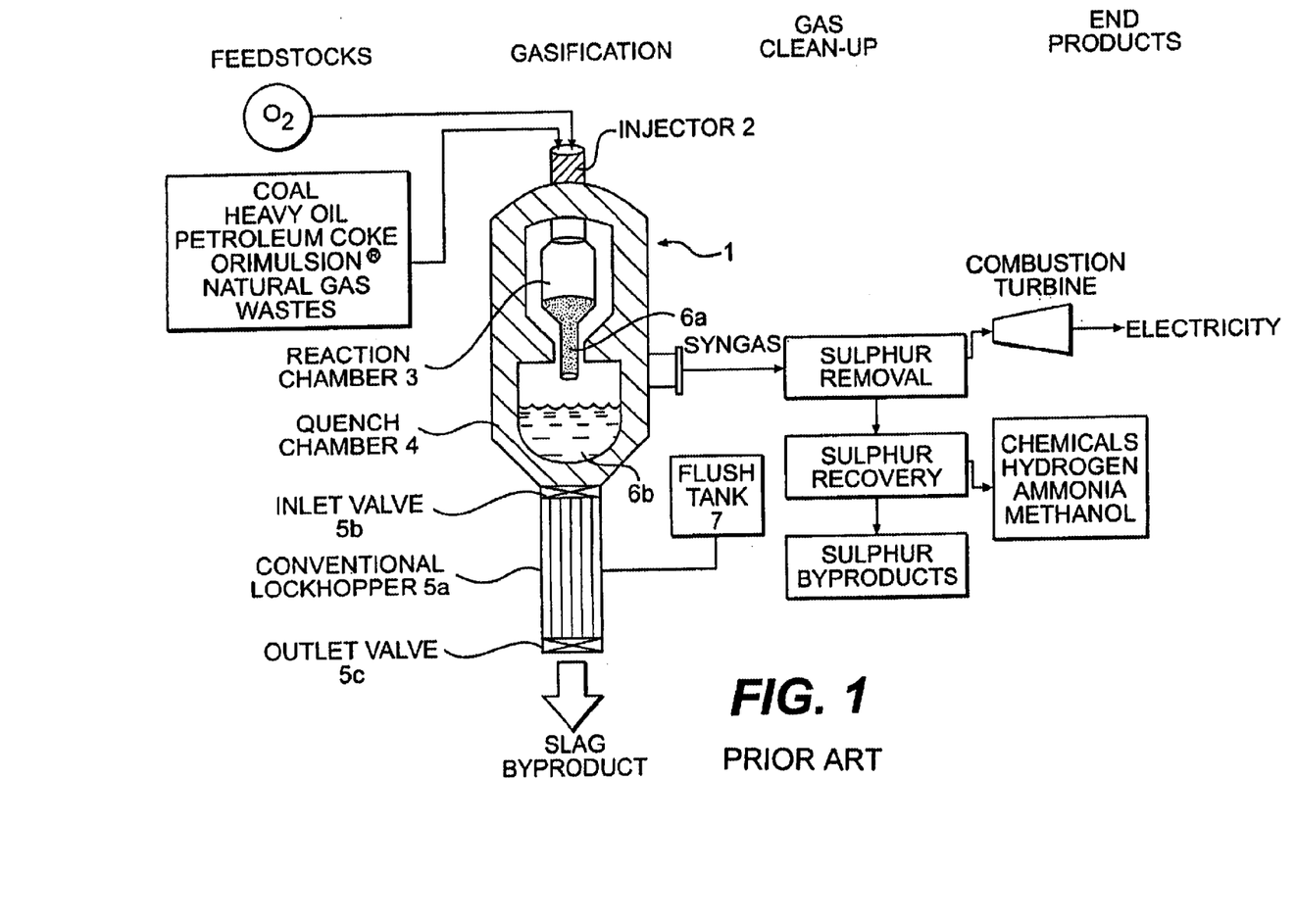
FIG. 1 is a diagram of a gasification system employing a conventional vertical lockhopper.

Referring first to FIG. 1, there is illustrated an exemplary gasification system including a conventional vertically-oriented lockhopper 5a. FIG. 1 illustrates a gasifier 1 which includes an injector 2 into which feedstocks are fed. The most commonly used feedstocks include coal, heavy oil, petroleum coke, and natural gas. It is understood to those skilled in the art that a wide range of wastes, raw materials, novel fuels such as Orimulsion®, and industrial byproducts may be used as feedstocks. In addition to carbonaceous feedstocks, oxygen is also usually fed into the injector 2.

The injector 2 leads into the reaction chamber 3, which is a chamber capable of subjecting the carbonaceous feedstocks and $O_2$ to high temperature and pressure conditions in order to break the feedstocks down to their elemental components and cause them to react to form synthesis gas. The resultant synthesis gas, or syngas, is composed primarily of $H_2$ and CO. The syngas produced in the reaction chamber is extremely hot and must be cooled. The most common means of cooling syngas are quench chambers and syngas coolers. An efficient gasification system uses the process of cooling the hot syngas to recover excess heat/energy, which may then be recycled for use in the gasifier.

FIG. 1 shows a gasification system employing a quench chamber 4 located directly beneath reaction chamber 3. Quench chambers cool syngas directly by contacting the hot syngas with water. The syngas is thereby cooled and saturated with steam. The cooled syngas exits the gasifier 1 and is then subjected to a series of cleaning processes, including sulfur removal, before being used to produce a useful end product such as electricity or industrial chemicals. As an alternative to a quench chamber, syngas cooler, or similar device for cooling hot gases may be used. The syngas cooling device need not recover heat/energy for reuse in the gasifier reaction chamber 3. Less efficient gas coolers simply expel excess heat into the atmosphere or into a reservoir. The present invention is not constrained in its application to any particular type of device or method for cooling gases.

In addition to syngas, reaction chamber 3 produces a molten slag byproduct 6a composed of non-gasifiable ash material and a very small amount of unconverted carbonaceous feedstock. Gravity causes this molten byproduct 6a to fall into quench chamber 4, as shown in FIG. 1. In quench chamber 4, the byproduct 6a is rapidly cooled and solidified by directly contacting the water. The quenched, solidified slag 6b then drifts downwards through the continuous water column formed inside the quench chamber 4 and the lockhopper 5a.

FIG. 1 shows a conventional lockhopper 5a, typically a cylindrical vessel vertically oriented beneath the gasifier 1 and filled completely with water in such a way that a continuous column of water is formed between quench chamber 4 and lockhopper 5a when inlet valve 5b is open. Although FIG. 1 is not drawn to scale, it is evident that the conventional lockhopper 5a can require that gasifier 1 be significantly elevated. In addition, conventional lockhoppers do not dewater slag. Therefore, additional heavy machinery such as a slag sump with a drag conveyor or a slag pad system (not shown) must be installed below the lockhopper.

Moreover, flush tank 7 must be used with conventional lockhopper systems in order to provide the large amounts of flush water needed to purge the lockhopper.

Figure 2A:
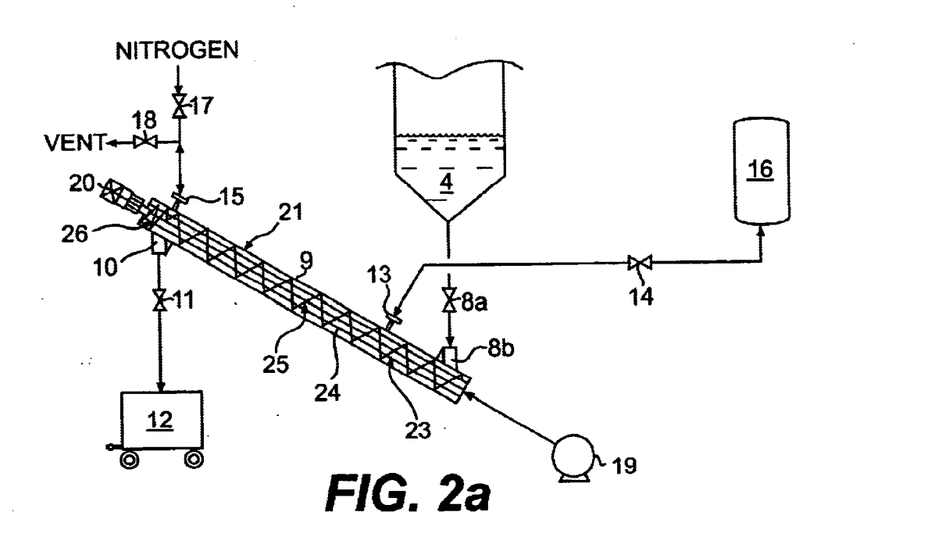
FIG. 2a is a diagram of a gasification system employing one embodiment of the present invention.
Figure 2B:
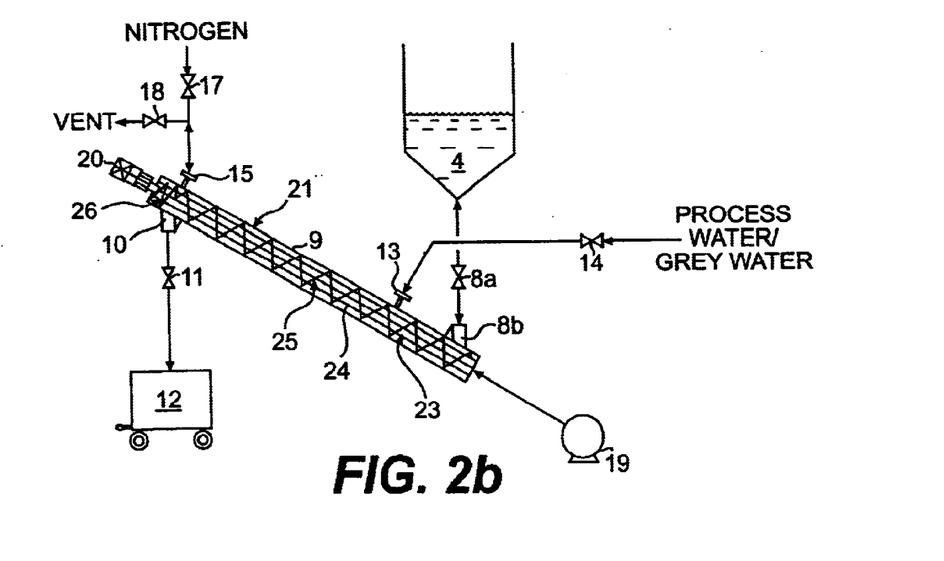
FIG. 2b is a diagram of a gasification system employing an alternate embodiment of the present invention.

Turning now to FIGS. 2a and 2b, improved gasification systems employing principles of the present invention are shown in part in each diagram. FIG. 2a shows quench chamber 4 from which slag is passed to the lockhopper system. Slag passes from quench chamber 4 through inlet valve 8a to the inlet 8b of the conveying lockhopper 9 of the present invention. As explained above, the advantages of the present invention may be recognized independent of any particular syngas cooling device. Therefore, the quench chamber described herein is for illustrative purposes only and the present invention should not be interpreted as being limited only for use with a quench chamber. Moreover, the present invention is not limited to withdrawing slag. Rather, the present invention can be employed with a wide variety of industrial byproducts or other types of material.

Returning to FIG. 2a, inlet valve 8a admits slag into lockhopper 9. Valve 8a may comprise any of a wide variety of well known mechanical or computer-regulated valves. Valve 8a should be opened during the slag collection mode to enable slag to collect within lockhopper 9. During the dump mode when slag is cleared out of the lockhopper, part of the preparation for dump mode will usually involve closing inlet valve 8a so that no slag can enter lockhopper 9 while it is being purged, but also so that lockhopper 9 can be depressurized before being dumped. The process for dumping slag from lockhopper 9, including the step of depressurizing, will be discussed in more detail below, following description of the lockhopper system equipment.

The embodiment of conveying lockhopper 9 shown in FIG. 2a depicts lockhopper 9 at approximately a 45 degree angle relative to the horizontal position. The horizontal position refers to the position lockhopper 9 would be in if laid along its elongated side such that its longitudinal axis were perpendicular to the line depicting the flow of slag from quench chamber 4 into inlet 8b. Conveying lockhopper 9 need not be situated at a 45 degree angle and, in fact, lockhopper 9 need not be inclined at all. In the preferred embodiment, conveying lockhopper 9 is disposed at an angle between approximately 5 degrees and approximately 60 degrees from the horizontal position.

Inlet 8b is disposed on the top edge of lockhopper 9 to receive slag from quench chamber 4. In the preferred embodiment, inlet 8b is fixed to the top edge of lockhopper 9 at an angle equivalent to the angle at which lockhopper 9 is inclined to the horizontal position. As a result, when lockhopper 9 is mounted in its inclined operating position, inlet 8b will be vertically oriented, that is, it will be perpendicular to the horizontal position, so that slag from quench chamber 4 can pass directly and in an unobstructed manner into lockhopper 9. In the preferred embodiment, outlet 10 is disposed at the opposite end on the bottom side of lockhopper 9 so that slag can be discharged. Outlet 10 can be mounted to lockhopper 9 at an angle, similarly to inlet 8b, so that slag discharged from outlet 10 falls directly into a container suitable for transporting processed slag, such as container 12. Moreover, as with inlet 8b, an outlet valve 11 can be used to control the flow of processed slag out of outlet 10.

Conveying lockhopper 9, which will be discussed in more detail with respect to FIGS. 3a, 3b, 4, and 5, generally comprises a housing 21 encasing an auger 23. Auger 23 comprises a rotating shaft 24 and a plurality of flights 25, which convey slag from inlet 8b towards outlet 10. In one embodiment of the present invention, the plurality of flights 25 includes at least one reversed flight 26 at the outlet end of shaft 24. The reversed flights 26 are also configured to convey slag toward the outlet, thus ensuring that no slag is forced past outlet 10 into the upper end of housing 21. Shaft 24 extends through the upper end of housing 21 so that it can couple with motor 20. Motor 20, which preferably is disposed outside and at the upper end of housing 21, may comprise any of a wide variety of well known motors such as hydraulic drive, variable speed, and reversible motors. Also visible in FIGS. 2a and 2b is pump 19, which purges a bearing at the inlet end of conveying lockhopper 9 with clean condensate water. This aspect of the invention will be described in more detail below.

In addition to inlet 8b and outlet 10, conveying lockhopper 9 can include other openings such as a water port 13 and a nitrogen port 15. Considering water port 13 first, it may be valve controlled, as shown in FIG. 2a with water tank valve 14 which leads to heel tank 16. Tank 16 contains water in the preferred embodiment, but in alternative embodiments of the present invention may contain other fluids that serve the same purposes in the gasification system. Note that water may flow in either direction through valve 14, into or out of tank 16. Similarly with respect to nitrogen port 15, nitrogen may flow into or out of the conveying lockhopper 9, and valves such as nitrogen inlet valve 17 and vent valve 18 may also be used to regulate the flow of nitrogen or other gases.

To more clearly describe the function of the water and nitrogen ports, the following example is given. It should be understood that the details described below are simplified to describe the primary factors involved in the process. As would be apparent to one of ordinary skill in the art, other secondary factors may affect the process. This example does not represent any limitation on the present invention. Corresponding reference numerals are used where appropriate.

The collection of slag begins with the conveying lockhopper 9 being filled with water to a level slightly below the elevation of outlet 10. Thus, the housing 21 is almost completely filled with water. With inlet valve 8a open, a continuous column of water is formed between lockhopper 9 and quench chamber 4. Slag particles which have been disengaged from the syngas in quench chamber 4 are, therefore, free to drift downwards, out of quench chamber 4 and into conveying lockhopper 9 via valve 8a and inlet 8b. Note that, in slag collection mode, because the conveying lockhopper is in direct communication with the quench chamber, both the water in the conveying lockhopper and the compressed gas cap (such as nitrogen) at the upper end of housing 21 are at essentially the same pressure as the quench chamber 4 and the gasifier reaction chamber 3.

When it is time to empty conveying lockhopper 9, the lockhopper will be put into slag dump mode. In this mode, inlet valve 8a is closed and the conveying lockhopper 9 is prepared for depressurization. Since the line from quench chamber 4 into conveying lockhopper 9 is open in the slag collection mode, conveying lockhopper 9 should be operating at approximately the same pressure as that within quench chamber 4 and gasifier reaction chamber 3. In the preferred embodiment, the operating pressure is substantially higher than the ambient pressure; therefore, it is prudent to depressurize the conveying lockhopper 9 prior to opening outlet valve 11 in order to avoid explosive decompression. In an alternative embodiment of the invention, the gasification system may operate at a lower pressure or at a pressure closer to the ambient pressure. Therefore, depressurization of the lockhopper might not be necessary. However, in the preferred embodiment, it is preferable and more efficient to operate the gasifier at high pressures. Consequently, the quench chamber and lockhopper would also operate at a high pressure.

Once inlet valve 8a is closed and before outlet valve 11 is opened, conveying lockhopper 9 is prepared for dumping by forcing some of the water present in conveying lockhopper 9 into tank 16. Valve 14 must of course be open to do this. The initial flow of water out of conveying lockhopper 9 and into tank 16 will be driven by the decompression and expansion of the gas cap at the upper outlet end of housing 21. The final portion of water pushed from the conveying lockhopper 9 into tank 16 can be driven by admitting high pressure nitrogen into conveying lockhopper 9 to push the water into tank 16. The flow of nitrogen is controlled by nitrogen inlet valve 17. When forcing nitrogen into the conveying lockhopper 9, vent valve 18 must be closed or else the high pressure nitrogen would leak out of the system. After water has been forced out of conveying lockhopper 9, the lockhopper can be depressurized by closing water tank valve 14 and nitrogen inlet valve 17, and opening vent valve 18 to allow the housing 21 to equilibrate with the ambient pressure. Once conveying lockhopper 9 is depressurized to a pressure close to the ambient air pressure, it will be safe to open outlet valve 11 and discharge the slag in the conveying lockhopper 9 into an awaiting container 12.

Water port 13 and nitrogen port 15 are not required to be positioned where shown in FIG. 2a. Those skilled in the art will recognize that the positions of these ports can be varied to accommodate other manifestations of the present invention, while remaining within the scope of the present invention. However, it is preferable to locate water port 13 near the lower end of housing 21 because only that much water that is present within the housing 21 above the elevation of the water port will be forced out. Water within housing 21 that is at a lower elevation than water port 13 will remain within housing 21, despite the use of a high pressure gas. Optimal placement of water port 13 will depend upon a variety of factors including, but not limited to, the amount of water in the system and the degree of inclination of conveying lockhopper 9. Similarly, the optimal placement for nitrogen port 15 will depend upon a variety of factors that should be evident to one skilled in the art. In the preferred embodiment, nitrogen port 15 is located near the upper or outlet end of the housing 21 so that the nitrogen port 15 will remain above the water level within the lockhopper, even when there is a substantial amount of water in housing 21.

It should also be apparent to one ordinarily skilled in the art that the gas employed need not necessarily be nitrogen. Any gas that will not cause an undesirable reaction with the contents of the conveying lockhopper 9 can be used. There are a number of factors that would be considered by one skilled in the art in choosing an appropriate gas to use. Those factors include, but are not limited to, cost, efficiency, availability, and health and safety concerns.

In an alternative embodiment of the present invention illustrated in FIG. 2b, the gasification system is essentially the same as that depicted in FIG. 2a, except that no heel tank 16 is employed. In this embodiment, lockhopper inlet valve 8a remains open at the end of the slag collection phase and nitrogen is used to force water in the conveying lockhopper 9 up into the quench chamber 4. Once a sufficient amount of water has been pushed out, valve 8a can be closed and vent valve 18 can be opened to depressurize the system. In this embodiment, valve 14 controls the flow of process or gray water that can be added into the conveying lockhopper 9 before resuming slag collection. This alternative embodiment may require more nitrogen than the embodiment of FIG. 2a in order to force water into quench chamber 4. However, less equipment is required (i.e., no heel tank 16).

Figure 2C:
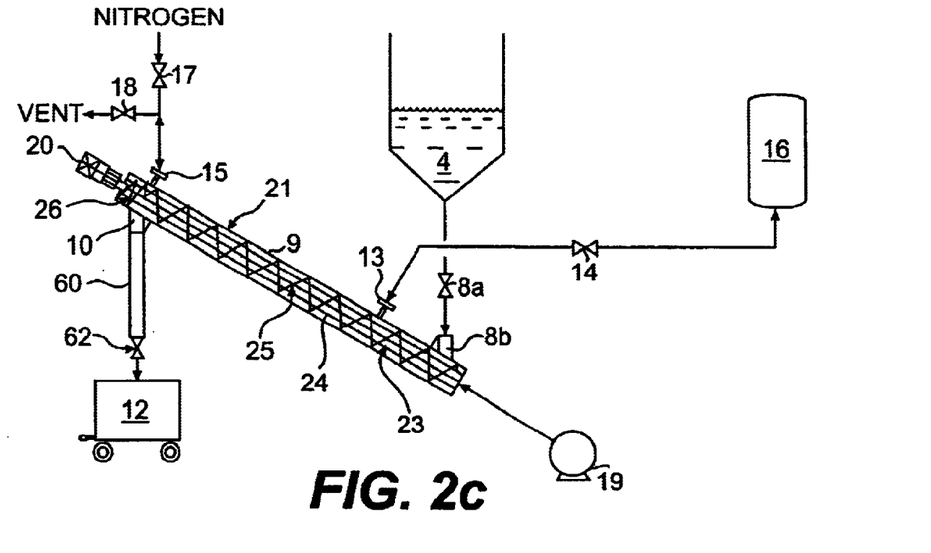
FIG. 2c is a diagram of a gasification system employing an alternate embodiment of the present invention.

In another embodiment of the invention depicted in FIG. 2c, a pipe spool 60 is added to outlet 10. Pipe spool 60 may be configured as a pipe, tube, or other type of suitable device for providing buffer storage. In this embodiment, outlet valve 11 is not present. Rather, this embodiment employs a pipe spool valve 62 to control the discharge of slag. Pipe spool 60 provides buffer storage for dewatered slag during the collection mode, while preserving the invention's advantage of simple discharging of slag into awaiting container 12. By providing pipe spool 60 in which dewatered slag can collect, it is far less likely that slag will collect at the upper end of housing 21 where it could clog outlet 10 and nitrogen port 15 if not promptly discharged. Moreover, auger 23 can be operated at a higher rotational speed and the time required for slag dumping may be reduced. By using pipe spool 60 to buffer excess dewatered slag, there is no need to calculate the auger rotational speed such that processed slag is just reaching the top of auger 23 when the slag collection period ends. Furthermore, in some embodiments that will be described below, slag collection may continue while dewatered slag is being purged from pipe spool 60, thus providing for a more efficient slag withdrawing process.

Pipe spool 60 is preferably the same diameter as that of outlet 10, usually between about 12 inches and about 20 inches for commercial plants. Those skilled in the art will recognize that the length and diameter of pipe spool 60 can be varied within the scope of the present invention. One factor that may be particularly relevant in choosing an appropriately sized pipe spool 60 is the volume of slag generated per lockhopper cycle. Preferably, the volume of pipe spool 60 will be sufficient to hold between 25 and 75 percent of the slag volume generated per collection cycle. Another factor that may be of importance in designing the size of pipe spool 60 is the rotational speed at which it is desired to operate auger 23. For example, the volume of pipe spool 60 can be designed such that, for a given auger speed, about 25 to 75 percent of the dewatered slag per collection cycle will be collected in pipe spool 60 by the end of the collection cycle. Any remaining slag will be distributed at the top of housing 21. This excess dewatered slag can be discharged within a very short time during the dump cycle. Therefore, dump cycle time can be significantly reduced. In addition, the length of pipe spool 60 should not significantly affect the gasifier elevation, since the conveying lockhopper 9 will reduce the overall structural height required for the gasifier, and because the location of pipe spool 60 is independent of the gasifier structure.

The embodiment of FIG. 2c employs pipe spool 60 in the gasification system of FIG. 2a, including heel tank 16. In an alternate embodiment depicted in FIG. 2d, pipe spool 60 is employed with the gasification system of FIG. 2b, in which tank 16 is not required. The use of pipe spool 60 is independent of the configuration chosen for other parts of the gasification system.

Figure 2D:
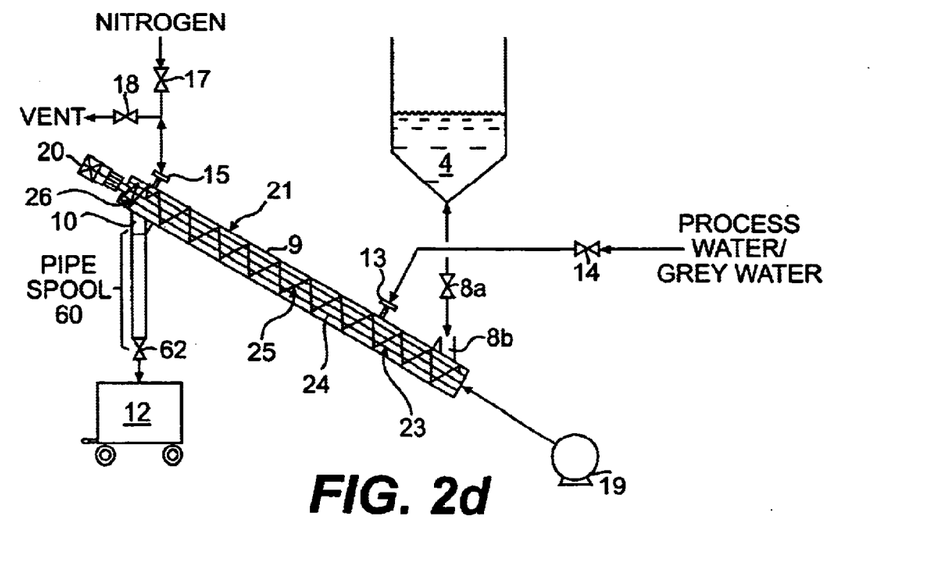
FIG. 2d is a diagram of a gasification system employing an alternate embodiment of the present invention.
Figure 2E:
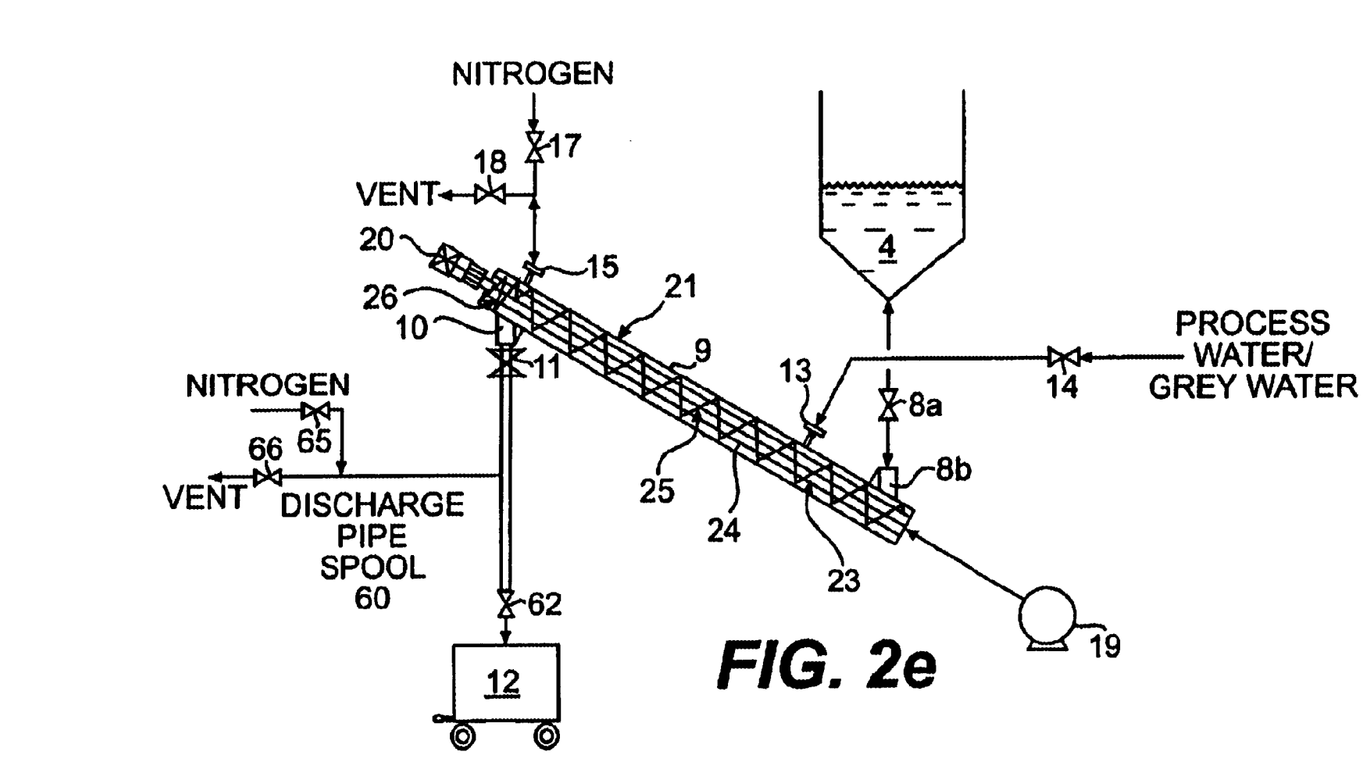
FIG. 2e is a diagram of a gasification system employing an alternate embodiment of the present invention.

In another embodiment depicted in FIG. 2e, pipe spool 60 is used with outlet valve 11, while also employing pipe spool valve 62. The presence of both valves 11 and 62 allows pipe spool 60 to be pressurized and depressurized independently of housing 21 in a similar manner as described above. As shown in FIG. 2e, the flow of nitrogen into pipe spool 60 is controlled by valve 65. Vent valve 66 allows for depressurization. There are two primary advantages to the embodiment shown in FIG. 2e. First, the housing 21 need not be depressurized before dumping slag. Second, the water level within the conveying lockhopper 9 does not have to be decreased in order to allow the dewatering and slag discharging steps to occur. In fact, by maintaining a large, pressurized gas cap at the upper end housing 21, a low water level, preferably 10–50 percent of the lockhopper's volume, can be maintained at all times so that slag dewatering naturally occurs as the slag is conveyed through the dry, upper portion of the conveying lockhopper 9. Thus, refill water via valve 14 is needed only to make up for water lost as surface water discharged with the dewatered slag.

If all the dewatered slag to be dumped is contained within pipe spool 60, outlet valve 11 can be closed and pipe spool 60 alone can be depressurized for dumping. Consequently, nitrogen consumption is significantly reduced since the volume being depressurized—pipe spool 60—is smaller than the volume of the entire conveying lockhopper 9. Moreover, the duration of the dump cycle is shorter and conveying lockhopper 9 can continue to process slag while pipe spool 60 is being dumped. In this embodiment, valves 14, 17, and 18 are used to maintain the desired water level in the lockhopper by admitting water via valve 14 and venting via valve 18 to increase the level or by admitting nitrogen via valve 17 to decrease the level by pushing water back up into the quench chamber 4.

Figure 3A:
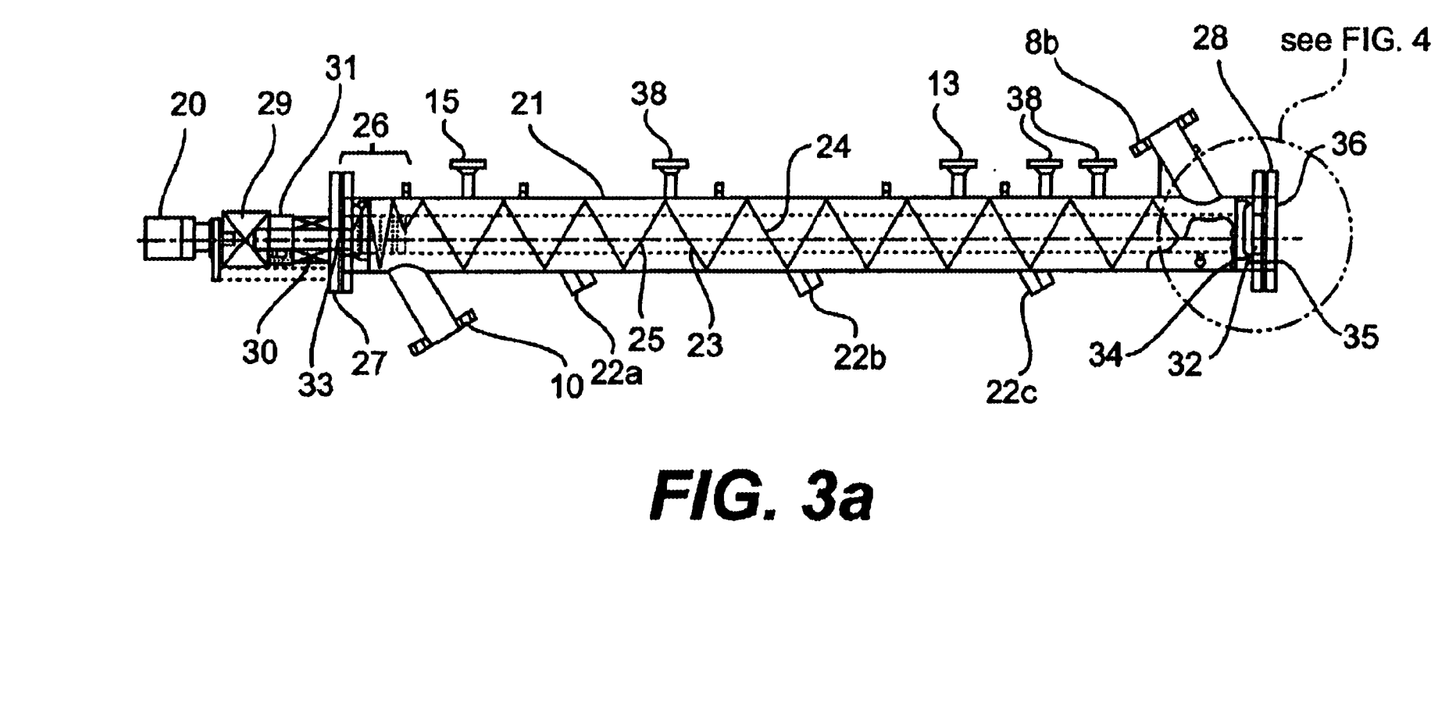
FIG. 3a is a detailed view of one embodiment of the present invention.

Referring now to FIG. 3a, a detailed diagram of one preferred embodiment of the present invention is shown. In FIG. 3a, conveying lockhopper 9, which includes housing 21, is shown positioned at a 0 degree angle with respect to the horizontal position for the sake of clarity. In the preferred embodiment, housing 21 comprises an elongated cylindrical casing with a constant diameter along substantially its entire length. Of course, a constant diameter is not required to realize the advantages of the present invention and those skilled in the art may vary the diameter to suit their needs. In addition, the preferred embodiment housing 21 has a length that is at least twice its diameter. This ratio may also be varied within the scope of the present invention. Moreover, a wide variety of materials may be chosen to manufacture housing 21. The most commonly used and preferred material is steel so that the conveying lockhopper 9 can withstand the rigors of heavy industrial processing and hold up to high gasifier pressures.

For illustrative purposes, the following example is given. It should be understood that the details described below are strictly exemplary and do not represent any limitation on the present invention. Corresponding reference numerals are used where appropriate. Housing 21 was constructed to be 18 feet in length with a diameter of 18 inches. Auger 23 was 17 feet in length with a shaft 24 diameter of 8 inches. The flights 25 were 15.5 inches in diameter and had a pitch of 9.5 inches. The flight dimensions were substantially consistent along the entire length of the auger shaft. The conveying lockhopper was run in slag collection mode for approximately 15 minutes, during which time the auger 23 rotated at a constant speed of 4 revolutions per minute (rpm) and the conveying lockhopper discharged slag at a rate of 1200 lbs/hour. The conveying lockhopper was then operated in dump mode wherein auger 23 rotated at 8 rpm. The lockhopper was operated in dump mode for approximately 2 minutes. During both collection and dump modes, instrumentation nozzles 38 (see FIG. 3a) were employed to monitor internal pressure, temperature, and fluid levels.

From FIG. 3a, it is clear how inlet 8b and outlet 10 can be fixed on the top and bottom surfaces, respectively, of housing 21 at an angle corresponding to the angle of inclination for conveying lockhopper 9. Similarly, housing 21 may include supports for supporting the conveying lockhopper 9 at its operating inclination. The embodiment of FIG. 3a shows three supports 22a, 22b, and 22c; however, more or less supports may be employed. The number of supports used will depend upon a variety of factors including, but not limited to, the size and weight of the lockhopper, the degree of inclination, and the size and strength of the supports. When conveying lockhopper 9 is mounted to the gasification system at its operating inclination, inlet 8b, outlet 10, and supports 22a, 22b, 22c should preferably be vertically oriented. In other words, inlet 8b, outlet 10, and supports 22a, 22b, 22c will preferably be positioned 90 degrees with respect to the horizontal position. Positioning inlet 8b and outlet 10 vertically will enable slag to freely enter and exit conveying lockhopper 9. Alternative embodiments of the present invention may, however, vary the angles at which inlet 8b and outlet 10 are mounted for a variety of reasons including the need to accommodate the positioning of the conveying lockhopper 9 beneath the gasifier 1. Housing 21 may also be fitted with other nozzles 38 for process connections and instrumentation.

Within housing 21, an auger 23 is disposed to convey slag from inlet 8 to outlet 10. Auger 23 is comprised of a rotating shaft 24 driven by motor 20. Mounted on shaft 24 are a plurality of flights 25 which serve to convey the slag along the length of shaft 24. The length and diameter of auger 23, which determine the length of housing 21, are preferably designed to provide deflection less than 1.0 inches for uniformly distributed loads across the length of shaft 24. Preferably, the diameter of the lockhopper and the distance between auger flights is chosen so that, for a given auger rotational rate and a given slag generation rate, each flight will be filled approximately 30 percent to 45 percent. The lengths of housing 21 and auger 23 may be chosen so that, for a given rotational rate during the slag collection mode, the first slag collected will just be approaching, but not yet have reached, outlet 10 at the end of the collection period. While the preferred embodiment employs an auger, it should be evident to one skilled in the art that any device may be employed that accomplishes an equivalent result; to wit, conveying the slag from one end of housing 21 to the other. An alternative embodiment of the present invention employs a large screw with threads mounted on the shaft. Another embodiment uses a conveyor that rotates lengthwise along the long axis of housing 21 with portions that carry the slag toward outlet 10.

In the preferred embodiment, flights 25 are helically disposed around shaft 24 along substantially the entire length of shaft 24. Preferably, the pitch of flights 25 is between 0.5 and 1.0 times the diameter of the housing. The pitch of flights 25 and the auger length are factors in determining the number of flights and the rotational speed required during slag collection and dump modes. The diameter of flights 25 is preferably designed to have a clearance of 0.5 inch to 1.0 inch with the inner wall of housing 21. In one embodiment of the present invention, the flight at the bottom of shaft 24 just below inlet 8b is thicker than the rest of the flights to serve as a crusher for large slag particles. The thickness of the flights 25 may be varied at any location on shaft 24 to accommodate particular embodiments of the invention.

Figure 6:
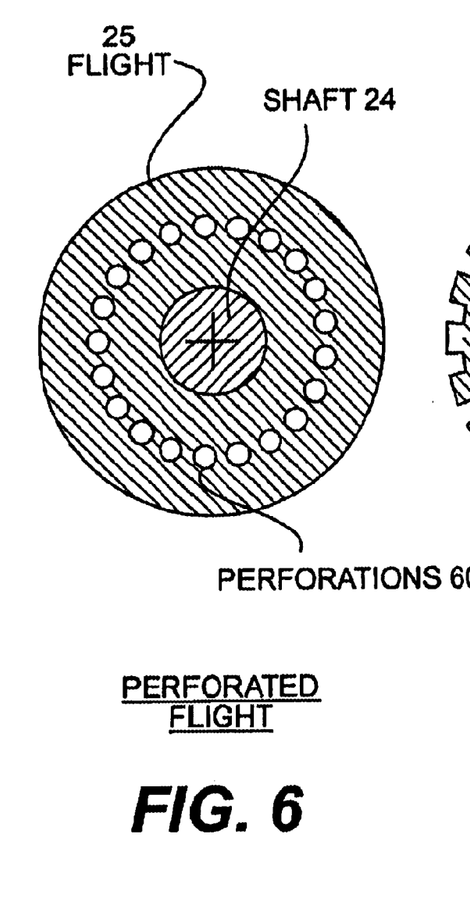
FIG. 6 is a diagram of one embodiment of flight geometry of the present invention.
Figure 7:
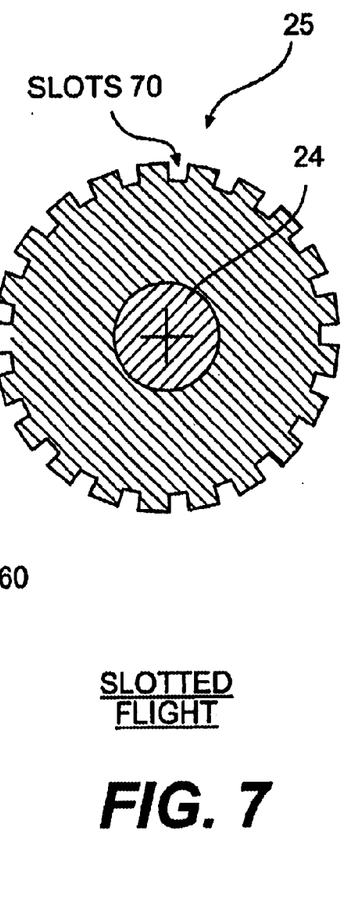
FIG. 7 is a diagram of another embodiment of flight geometry of the present invention.
Figure 8:
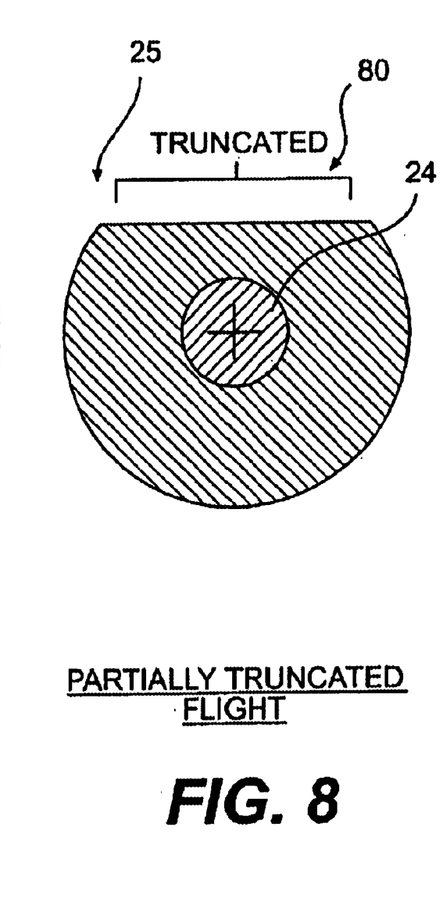
FIG. 8 is a diagram of another embodiment of flight geometry of the present invention.

In another aspect of the present invention, flights 25 may be constructed of various geometries including those depicted in FIGS. 6, 7, and 8. In FIG. 6, a perforated flight is depicted having holes or perforations 60 positioned radially about the center of the flight. The holes may serve a number of purposes including allowing water within the lockhopper to pass through, thereby enhancing the dewatering of slag. Similarly, another embodiment shown in FIG. 7 depicts a flight with slots 70 located radially about the outer edge of the flight. In another embodiment of the present invention depicted in FIG. 8, a truncated flight is shown wherein a portion 80 of the otherwise solid flight has been removed. The size, number, and location of holes, slots and truncated portions may be varied to accommodate different purposes. Moreover, an auger or equivalent conveying mechanism may employ more than one type of flight along the length of its shaft. The alternative flight geometries of FIGS. 6, 7, and 8 are only a few of the various geometries that may be employed with the present invention. One skilled in the art will recognize that flights of various sizes and geometries may be employed, all within the scope of the invention.

In another aspect of the present invention, reversed flights 26 may be employed at some point along shaft 24 (best seen in FIG. 3*a*). The preferred embodiment employs reversed flights 26 at the upper end of shaft 24. Reversed flights 26 are situated on shaft 24 such that they convey slag in a direction opposite to the direction in which flights 25 convey slag. Reversed flights 26 are configured to convey slag to outlet 10. The use of reversed flights ensures that debris does not collect at the upper end of housing 21. Excess debris could hamper the rotation of shaft 24, damage seal 30, or occlude the passage of slag out through outlet 10 or clog nitrogen port 15, thus causing motor 20 to have to work harder to rotate shaft 24. Reversed flights 26 may be configured with one or more of the geometries shown in FIGS. 6, 7, and 8, or other suitable geometries apparent to one skilled in the art.

Motor 20 is preferably disposed outside and at the upper end of housing 21. Motor 20 may comprise any of a wide variety of well known motors for operating equipment of that type. Exemplary motors include hydraulic drive, variable speed, and reversible motors. In the preferred embodiment, a hydraulic drive motor with a gear reducing system is employed to provide the high torque required to turn auger 23 at low speeds with full slag loads during the collection mode. Housing 21 has a top flange 27 and a bottom flange 28. In the preferred embodiment, shaft 24 extends through an opening 33 in top flange 27 so that shaft 24 can couple to motor 20. As depicted in FIG. 3*a*, a flexible coupling 29 may be used to couple shaft 24 to motor 20. Flexible coupling 29 is employed to absorb shock loading and prevent shaft 24 from twisting.

Because shaft 24 extends through top flange 27, and because conveying lockhopper 9 is preferably pressurized during slag collection, a seal 30 is preferably employed to seal opening 33 in top flange 27 through which shaft 24 extends. Seal 30 may comprise any of a wide variety of well known seals, but the preferred embodiment employs either a double mechanical seal or a packing seal to allow shaft 24 sufficient freedom to rotate efficiently while maintaining the desired pressure within housing 21. A double mechanical seal or a quickly replaceable packing seal is preferred to hold the lockhopper at the operating pressure.

Figure 3B:
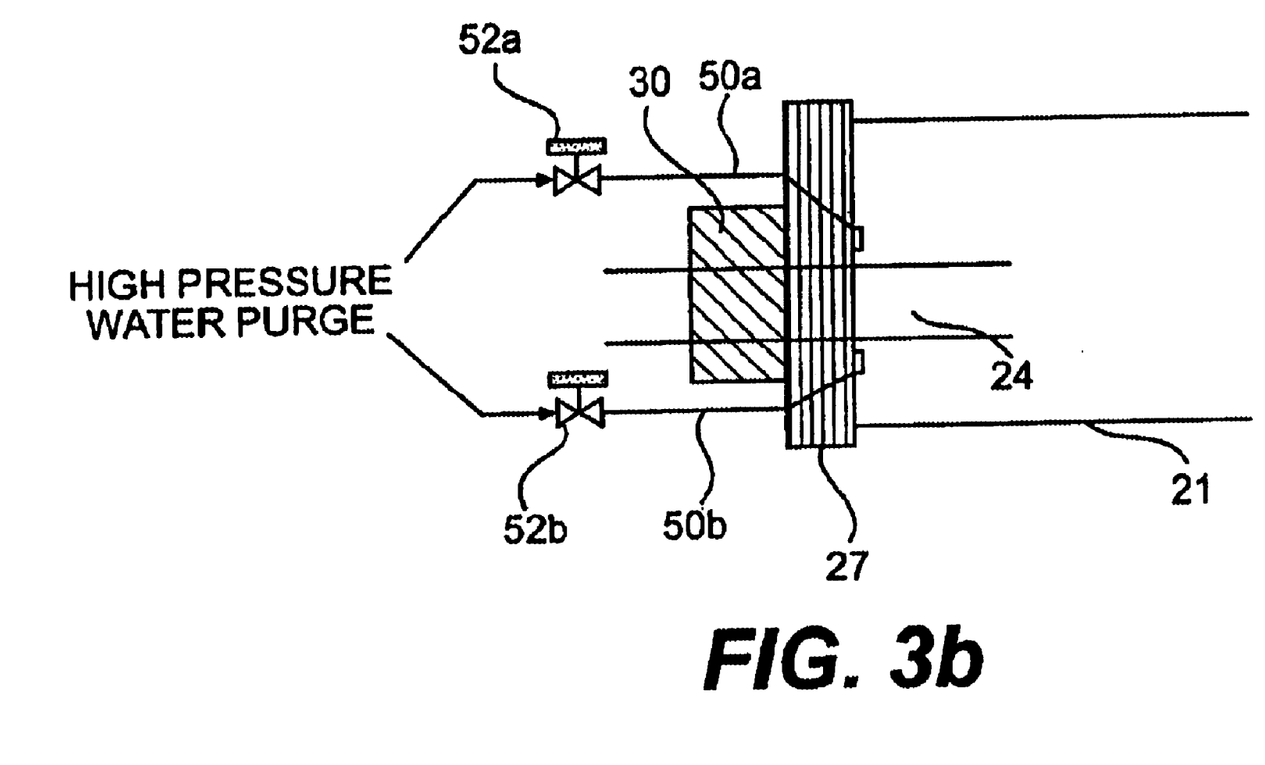
FIG. 3b is a diagram of one embodiment of a seal of the present invention.

In one embodiment of the present invention, a double mechanical seal assembly with a coolant circulation system is used. The coolant circulation system is configured to absorb pressure in between the two seals. In another embodiment, a high pressure water purge system is used to clean the surface of auger shaft 24 in contact with seal 30 and opening 33, as shown in FIG. 3*b*. The surface of shaft 24 in contact with seal 30 should be kept clean of all slag particles to keep the seal from rupturing. The preferred purge system comprises two water lines 50*a* and 50*b*, which are preferably 0.125 inch to 0.50 inch in diameter. Water lines 50*a* and 50*b* penetrate top flange 27 such that they are tangential to the inner surface of top flange 27 and disposed oppositely of each other, as shown in FIG. 3*b*. Since purge lines 50*a* and 50*b* are tangential to the inner surface of top flange 27 and are 180 degrees apart, a swirling motion of water is created around shaft 24, thereby cleaning out any solid particles that stick to shaft 24 or to the surface of seal 30. Water flowing through water lines 50*a* and 50*b* is controlled by two valves, 52*a* and 52*b*, one on each line. Alternatively, a single valve connecting both the lines may be used. Water line valves 52*a* and 52*b* may be computer or mechanically controlled such that the water purge to the portion of shaft 24 that is in contact with seal 30 occurs on a timed basis. For example, water line valves 52*a* and 52*b* may be programmed to open once every 15 to 60 minutes in short burst of 1 to 10 seconds during lockhopper operation. In such an embodiment, an insignificant amount of water would be introduced to the system, thereby not significantly affecting the moisture content of the dewatered slag. By keeping the portion of shaft 24 that is in contact with seal 30 free of debris, the overall life of the seal may be increased considerably, thereby reducing operating and capital costs associated with maintaining and replacing ruptured seals.

Bearings support auger 23 while ensuring that auger 23 is free to operate efficiently. In FIG. 3*a*, bearings are located at both the upper and lower ends of shaft 24. At the upper end, upper bearing 31 is disposed along shaft 24 between seal 30 and flexible coupling 29. At the opposite end, lower bearing 32 is disposed where shaft 24 meets bottom flange 28. Preferably, lower bearing 32 is welded to bottom flange 28. In the preferred embodiment of the present invention, upper bearing 31 is a pillow block bearing, which is designed to absorb radial and shock loading, and lower bearing 32 is a thrust bearing. A shroud may be employed to cover the bearings. In the embodiment depicted in FIG. 3*a*, shroud 34 envelopes lower bearing 32. Shroud 34 is bolted onto the lower bearing block such that it has a very small clearance, preferably a clearance of between 0.025 inches and 0.25 inches all around shaft 24. Lower bearing 32 is particularly susceptible to corrosion and malfunction due to its placement within housing 21 at the lower end where slag, water, and other materials will collect. Therefore, a shroud to protect the bearing is preferred. Different types of bearings may be used depending upon the exact embodiment of the invention employed. Moreover, the present invention is not limited to two bearings, one positioned at each end of auger shaft.

Figures 4, 5:
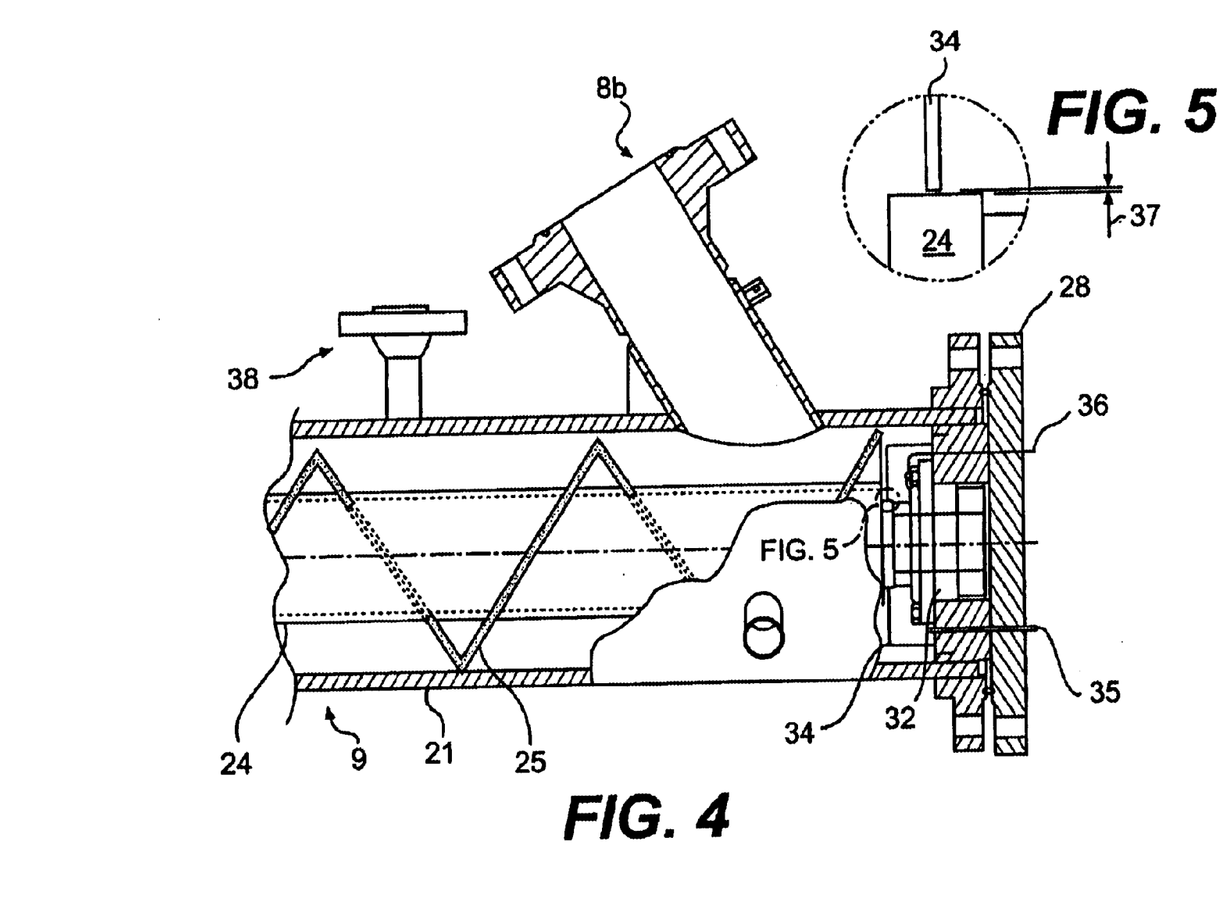

FIG. 4 shows the lower end of the conveying lockhopper 9 in substantial detail. In this perspective, the placement of lower bearing 32 in the preferred embodiment is apparent. Also visible is bearing shroud 34 which encases lower bearing 32. FIG. 4 also depicts a bearing purge water inlet 35 and a bearing grease plug 36. Because lower bearing 32 is disposed within housing 21, access through bottom flange 28 should be provided for routine maintenance of lower bearing 32. To maintain lower bearing 32 in proper working order, it should be regularly purged with water and greased. Bearing grease plug 36 allows lower bearing 32 to be greased while the system is operating. Inset in FIG. 4 is FIG. 5, which shows a close-up view of the clearance 37 between the shroud 34 and the auger shaft 24. Clearance 37, which preferably is between 0.025 inches and 0.25 inches all around shaft 24, may be varied depending upon a variety of factors apparent to those skilled in the art. Primarily, clearance 37 is determined based upon the purge flow velocity required to keep fine particles entering the bearing area. The purging of lower bearing 32 is accomplished by adding clean water or process water condensate in the shroud 34 through the bearing purge water inlet 35.

With the foregoing description of the invention provided, another aspect of the present invention will now be described in which the apparatus of the invention is used with a gasification system. To more clearly describe the process of the present invention, the following description is provided in exemplary terms. It is to be understood that the details described below are simplified to describe the primary factors involved in gasification. As would be apparent to one of ordinary skill in the art, other secondary factors may affect the process. This example should not represent any limitation on the present invention. FIGS. 2a and 2b are particularly useful in describing the processes of the present invention. Corresponding reference numerals are used where appropriate.

As stated above, the conveying lockhopper 9 operates in two modes: slag collection mode and dump mode. Considering FIG. 2a, in slag collection mode, inlet valve 8a is open, outlet valve 11 is closed, and the conveying lockhopper 9 is at approximately the same pressure as the gasifier. Collection mode typically lasts for 10–30 minutes, and during this time, slag continuously drifts down through the common water column formed between quench chamber 4 and conveying lockhopper 9, entering conveying lockhopper 9 through inlet 8b. During collection mode, auger 23 is turning at a speed between approximately 0.25 rpm and approximately 10 rpm. The rotational rate preferably provides for flights 25 to be less than 100 percent filled with slag. The water level in the lockhopper during collection is below outlet 10, preferably filling about 60 to 85 percent of housing 21. The slag is slowly conveyed in the upward direction toward outlet 10. The collection time and speed of the auger 23 are designed such that the slag collected in the first flight at the start of the collection mode is conveyed to the upper end of housing 21 just below outlet 10 by the end of collection period.

In one embodiment, dumping slag from conveying lockhopper 9 consists of four steps: (1) depressurizing the lockhopper; (2) dewatering and dumping the slag; (3) refilling the lockhopper with water; and (4) pressurizing the lockhopper. Steps 3 and 4 are performed to prepare the lockhopper for the ensuing collection cycle.

Beginning with depressurization of the lockhopper, at the end of the slag collection mode, the lockhopper inlet valve 8a is closed and auger 23 is stopped. The water level in the lockhopper is reduced to just above inlet 8b, preferably so that water fills only about 1 to 5 percent of the lockhopper. The water level is reduced by pushing the water into the atmospheric heel tank 16 using nitrogen. The initial driving force for moving the conveying lockhopper water into heel tank 16 comes from the decompression and expansion of the nitrogen gas cap at the top of housing 21. This decompression and expansion occurs as soon as valve 14 opens to connect the pressurized conveying lockhopper 9 with the atmospheric heel tank 16. The final driving force for moving water into heel tank 16 comes from adding additional pressurized nitrogen, which enters housing 21 through nitrogen port 15 and is controlled by nitrogen inlet valve 17. It is important that vent valve 18 is closed during this operation. After the water has been pushed into heel tank 16, heel tank valve 14 is closed and vent valve 18 is opened to depressurize housing 21 of any remaining nitrogen.

The next step is to dewater and dump the slag. Once the pressure in the lockhopper is less than approximately 10 psig, outlet valve 11 is opened. Auger 23 is restarted, preferably at a speed between 1 and 20 rpm for approximately 1 to 2 minutes. During this period, auger 23 is either turning continuously or cycling on and off at a predetermined rate. The on-off cycle for auger 23 is determined based upon the extent of slag dewatering required. At the end of this step, when all of the dewatered slag has been discharged, outlet valve 11 is closed. The slag discharged during this step is deposited as dewatered slag directly into containers 12 suitable for immediate transportation.

Following the slag dewatering and dumping step, the conveying lockhopper 9 is refilled with water from tank 16 by opening tank valve 14. Water flows by gravity into the lockhopper, while atmospheric nitrogen inside the lockhopper is vented through vent valve 18. Once the lockhopper has been filled, preferably to a level between 60 and 85 percent of the lockhopper's volume and, preferably, so that the water level is just below outlet 10, then vent valve 18 and tank valve 14 are closed.

The final step in dumping the conveying lockhopper 9 and preparing it for the next collection cycle involves pressurizing housing 21 to the gasifier operating pressure, preferably about 500 psig. Nitrogen or some other inert gas is fed through nitrogen inlet valve 17 into nitrogen port 15. When the differential pressure between the gasifier and lockhopper 9 is preferably less than 15 psig, inlet valve 8a is opened to begin the collection mode allowing slag to settle by gravity into conveying lockhopper 9. During the entire lockhopper operation, pump 19 runs continuously to purge lower bearing 32 with clean condensate water through bearing purge water inlet 35.

In an alternative embodiment of the present invention described with reference to FIG. 2b, the conveying lockhopper 9 is employed in a gasification system without the use of a separate tank 16. In this embodiment, the operation of lockhopper 9 is very similar to that described above with the exception of the sequence of operations involved in depressurizing the lockhopper and refilling the lockhopper with water.

With respect to depressurizing the lockhopper, at the end of the slag collection mode, inlet valve 8a is left open so that the water from the lockhopper can be pushed back into quench chamber 4. As described above, this is accomplished using high pressure nitrogen entering through nitrogen port 15. The lockhopper water level is reduced to a level just above inlet 8b, and then the inlet valve 8a is closed. Vent valve 18 is then opened to depressurize housing 21. With respect to the step of refilling the lockhopper with water, this alternative embodiment differs in that housing 21 is filled with process water or gray water, instead of water from tank 16. The remaining steps of the operation are similar to those described above.

In the embodiments of FIGS. 2c and 2d, pipe spool valve 62 takes the place of outlet valve 11. Slag collection and dumping procedures are basically the same as described above; however, a longer collection cycle may be accommodated, if preferred, since pipe spool 60 acts as a buffer for the dewatered slag. The collection time and speed of the auger may be varied to achieve the desired slag discharge rate or to accommodate a specifically desired auger rotational rate.

In the embodiment of FIG. 2e in which pipe spool 60 is employed with both outlet valve 11 and pipe spool valve 62, the slag collection procedure is the same as with respect to the embodiments of FIGS. 2c and 2d, except that a lower water level can be maintained in housing 21. However, the procedure for slag dumping is slightly different. Instead of depressurizing the entire conveying lockhopper 9, dewatered slag can be dumped by only depressurizing pipe spool 60. To dump pipe spool 60, lockhopper outlet valve 11 is closed. Vent valve 66 is opened for a short period to depressurize pipe spool 60, preferably below 100 psig. During this operation, auger 23 may continuously run with inlet valve 8b being left open to allow concomitant slag collection in the lockhopper. When the pressure in pipe spool 60 is reduced to an acceptable level, pipe spool valve 62 is opened. The dewatered slag that collected in pipe spool 60 is dumped directly into a transportable container 12. If the pressure in pipe spool 60 is slightly above the ambient pressure, this pressure difference will enhance slag dumping by forcing the slag out, thereby reducing the time required to discharge the slag. After the slag has been dumped, valve 62 is closed. Pipe spool 60 must then be repressurized to the operating pressure of the conveying lockhopper 9 and gasifier. Pressurization of pipe spool 60 can be accomplished using an inert gas such as nitrogen which is fed into pipe spool 60 through nitrogen valve 65. Once pipe spool 60 is pressurized, outlet valve 11 can be opened to resume collecting dewatered slag. Since only pipe spool 60 must be pressurized and depressurized, the amount of nitrogen used and the time required to perform these operations are significantly reduced.

Figure 9:
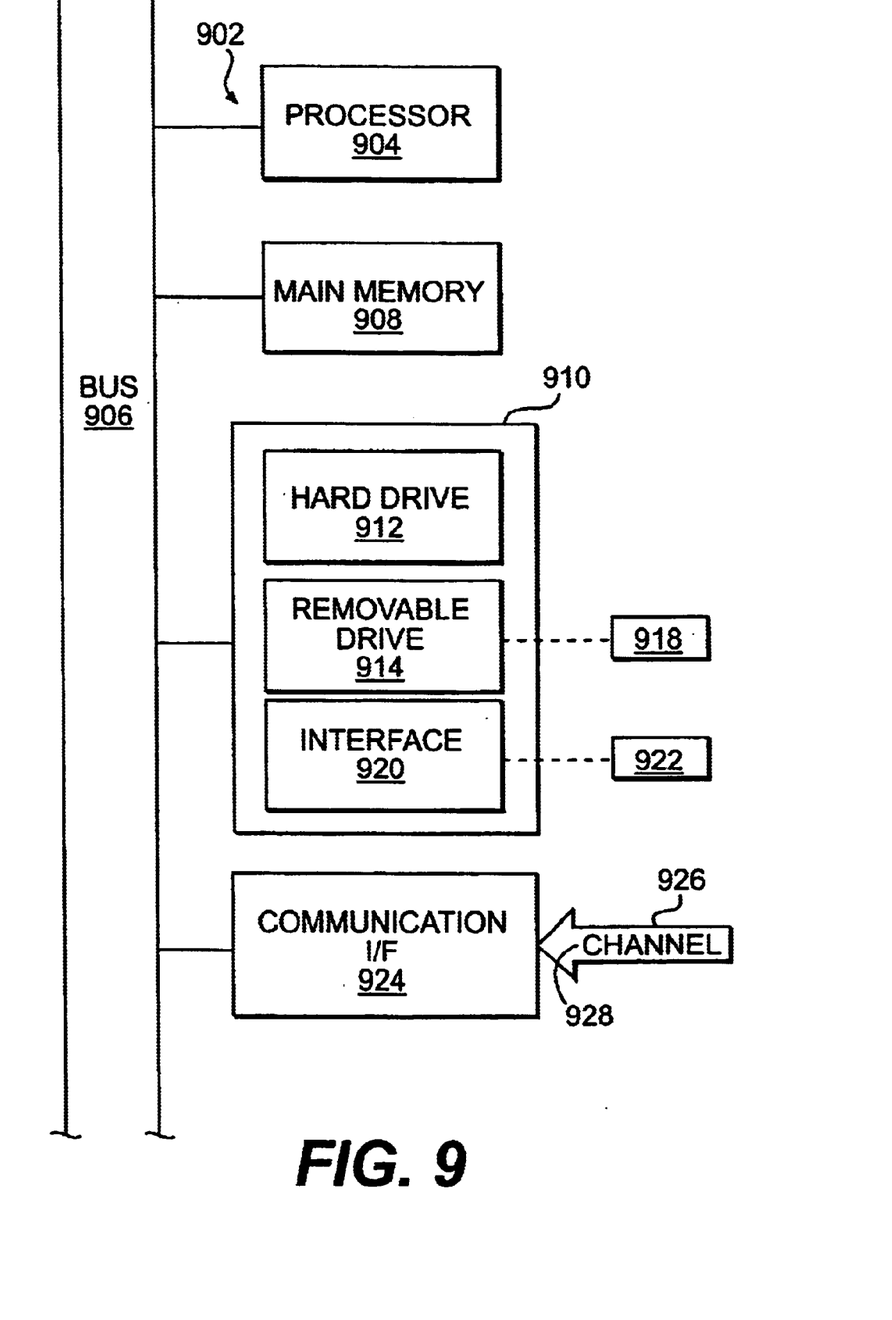
FIG. 9 shows a computer system suitable for use with the present invention.

In an alternate embodiment of the present invention, the system and method of the present invention are controlled by a computer system, such as computer system 902 depicted in FIG. 9. In such an embodiment, the various valves in the system (such as valves 8a, 11, 14, 17, 18, 62, 65, and 66) are configured for control and operation by a computer in a manner known to one skilled in the art. Similarly, ports 13 and 15, inlet 8b and outlet 10 can be configured for control and operation by a computer in a manner known to one skilled in the art. The functionality of the present invention, and the steps of the methods described above, can be carried out using a computer system. Moreover, instrumentation to observe conditions such as levels, pressure, and temperature may be monitored by a computer system which can be programmed to respond automatically to anomalies or specified conditions. Particularly, a computer system can be used to control the operation of the conveying lockhopper in the collection and dump modes.

A computer system capable of carrying out the functionality described herein is shown in more detail in FIG. 9. Computer system 902 includes one or more processors, such as processor 904. Processor 904 is connected to a communication bus 906. It should be apparent to a person skilled in the relevant art how to implement the invention using other computer systems and/or computer architectures.

Computer system 902 also includes a main memory 908, preferably random access memory (RAM), and can also include a secondary memory 910. Secondary memory 910 can include, for example, a hard disk drive 912 and/or a removable storage drive 914, representing a floppy disk drive, a magnetic tape drive, an optical disk drive, etc. Removable storage drive 914 reads from and/or writes to a removable storage unit 918 in a well known manner. Removable storage unit 918, represents a floppy disk, magnetic tape, optical disk, etc. which is read by and written to by removable storage drive 914. As will be appreciated, removable storage unit 918 includes a computer usable storage medium having stored therein computer software and/or data.

In alternative embodiments, secondary memory 910 may include other similar means for allowing computer programs or other instructions to be loaded into computer system 902. Such means can include, for example, a removable storage unit 922 and an interface 920. Examples of such can include a program cartridge and cartridge interface (such as that found in video game devices), a removable memory chip (such as an EPROM, or PROM) and associated socket, and other removable storage units 922 and interfaces 920 which allow software and data to be transferred from removable storage unit 922 to computer system 902.

Computer system 902 can also include a communications interface 924. Communications interface 924 allows software and data to be transferred between computer system 902 and external devices. Examples of communications interface 924 can include a modem, a network interface (such as an Ethernet card), a communications port, a PCM-CIA slot and card, etc. Software and data transferred via communications interface 924 are in the form of signals 926 that can be electronic, electromagnetic, optical or other signals capable of being received by communications interface 924. Signals 926 are provided to communications interface via a channel 928. Channel 928 carries signals 926 and can be implemented using wire or cable, fiber optics, a phone line, a cellular phone link, an RF link and other communications channels.

In this document, the terms "computer program medium" and "computer usable medium" are used to generally refer to media such as removable storage device 918, a hard disk installed in hard disk drive 912, and signals 926. These computer program products are means for providing software to computer system 902.

Computer programs (also called computer control logic) are stored in main memory 908 and/or secondary memory 910. Computer programs can also be received via communications interface 924. Such computer programs, when executed, enable computer system 902 to perform the features of the present invention as discussed herein. In particular, the computer programs, when executed, enable processor 904 to perform the features of the present invention. Accordingly, such computer programs represent controllers of computer system 902.

In an embodiment where the invention is implemented using software, the software may be stored in a computer program product and loaded into computer system 902 using removable storage drive 914, hard drive 912 or communications interface 924. The control logic (software), when executed by processor 904, causes processor 904 to perform the functions of the invention as described herein.

In another embodiment, the invention is implemented primarily in hardware using, for example, hardware components such as application specific integrated circuits (ASICs). Implementation of such a hardware state machine so as to perform the functions described herein will be apparent to persons skilled in the relevant art(s).

In yet another embodiment, the invention is implemented using a combination of both hardware and software.

As described above, and as shown in the above example, the present invention provides a system and method for gasification. It should be apparent that the present invention may be used to increase efficiency and to lower equipment and operating costs, while achieving more desirable results.

Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

We claim:

1. A method of withdrawing and dewatering slag from a gasification system comprising a gasifier, said method comprising:

receiving slag from the gasification system into an inlet of a conveying lockhopper, conveying the slag from the inlet of the conveying lockhopper to an outlet of the conveying lockhopper, wherein the outlet is at a higher elevation than the inlet, and wherein the step of conveying the slap comprises rotating an auger disposed in the conveying lockhopper to convey the slag from the inlet to the outlet, thereby breaking down the slag and separating the slag from the water; and discharging the slag from the outlet.

2. The method of claim 1, wherein said step of receiving slag comprises opening a valve at the inlet to enable slag to collect in the conveying lockhopper.

3. The method of claim 1, wherein said step of receiving slag comprises closing a valve at the outlet.

4. The method of claim 1, wherein during said step of receiving slag, the pressure within the conveying lockhopper is approximately the same as the pressure within the gasification system.

5. The method of claim 1, wherein said step of conveying the slag further comprises rotating the auger at a rotational speed between approximately 0.25 revolutions per minute and approximately 10 revolutions per minute.

6. The method of claim 1, further comprising the step of providing a storage buffer for receiving dewatered slag from the outlet.

7. The method of claim 6, wherein the storage buffer receives slag from the outlet.

8. The method of claim 1, wherein said step of discharging the slag comprises:

closing a valve at the inlet of the conveying lockhopper; and opening a valve at the outlet of the conveying lockhopper.

9. The method of claim 1, wherein said step of discharging the slag comprises forcing a fluid from the conveying lockhopper into a tank coupled to the conveying lockhopper.

10. The method of claim 9, wherein said step of discharging the slag further comprises using an inert gas to force the fluid from the conveying lockhopper into the tank.

11. The method of claim 10, wherein the inert gas is nitrogen.

12. The method of claim 9, wherein the tank is an atmospheric heel tank.

13. The method of claim 9, wherein the tank is a quench chamber of the gasification system.

14. The method of claim 9, wherein the tank is a syngas cooling apparatus of the gasification system.

15. The method of claim 1, further comprising depressurizing the conveying lockhopper prior to said step of discharging the slag.

16. The method of claim 1, further comprising the step of adding a fluid to the conveying lockhopper from a tank coupled to the conveying lockhopper.

17. The method of claim 1, further comprising the step of pressurizing the conveying lockhopper to approximately the same pressure as the pressure within the gasification system.

18. The method of claim 17, wherein said step of pressurizing the conveying lockhopper is carried out using an inert gas.

19. The method of claim 18, wherein the inert gas is nitrogen.

20. The method of claim 1, wherein said step of discharging the slag comprises:

closing a valve at the inlet of a slag storage buffer; and opening a valve at the outlet of the slag storage buffer.

21. The method of claim 20, further comprising depressurizing the slag storage buffer prior to said step of discharging the slag.

22. The method of claim 1, further comprising the step of pressurizing a slag storage buffer to approximately the same pressure as the pressure within the conveying lockhopper.

23. The method of claim 22, wherein said step of pressurizing the slag storage buffer is carried out using an inert gas.

24. The method of claim 23, wherein the inert gas is nitrogen.

* * * * *